United States Patent
Takahashi et al.

(10) Patent No.: US 12,162,643 B2
(45) Date of Patent: Dec. 10, 2024

(54) PACKAGING MACHINE

(71) Applicant: GENERAL PACKER CO., LTD., Kitanagoya (JP)

(72) Inventors: Masaaki Takahashi, Kitanagoya (JP); Shinji Ishikawa, Kitanagoya (JP); Masanori Toyoyoshi, Kitanagoya (JP)

(73) Assignee: GENERAL PACKER CO., LTD., Kitanagoya (JP)

( * ) Notice: Subject to any disclaimer, the term of this patent is extended or adjusted under 35 U.S.C. 154(b) by 939 days.

(21) Appl. No.: 16/521,647

(22) Filed: Jul. 25, 2019

(65) Prior Publication Data

US 2019/0344912 A1 Nov. 14, 2019

Related U.S. Application Data

(63) Continuation-in-part of application No. 14/632,335, filed on Feb. 26, 2015, now abandoned.

(30) Foreign Application Priority Data

Oct. 29, 2014 (JP) ................................. 2014-220170

(51) Int. Cl.
  *B65B 7/08* (2006.01)
  *B65B 7/18* (2006.01)
  (Continued)

(52) U.S. Cl.
  CPC .............. *B65B 7/08* (2013.01); *B65B 43/465* (2013.01); *B65B 51/02* (2013.01); *B65B 51/146* (2013.01); *B29C 66/849* (2013.01)

(58) Field of Classification Search
  CPC .... B65B 7/08; B65B 7/18; B65B 7/20; B65B 49/02; B65B 49/06; B65B 49/14
  (Continued)

(56) References Cited

U.S. PATENT DOCUMENTS 1,998,287 A * 4/1935 Pierson ..................... B65B 7/08
  53/526
2,575,544 A   11/1951 Zinn, Jr.
  (Continued)

FOREIGN PATENT DOCUMENTS

JP   52-125090 A   10/1977
JP   53-110400 U   9/1978
  (Continued)

OTHER PUBLICATIONS

An office Action of the corresponding Korean Application No. 10-2015-0048935 mailed Aug. 19, 2020 and English translation thereof.

(Continued)

*Primary Examiner* — Thanh K Truong
*Assistant Examiner* — Patrick B Fry
(74) *Attorney, Agent, or Firm* — Muncy, Geissler, Olds & Lowe, P.C.

(57) ABSTRACT

A packaging machine includes a pair of grips holding vicinities of two sides of a bag mouth of a packaging bag, a moving body to intermittently moving the paired grips every one of a plurality of packaging steps, and a paper packaging bag sealing device provided in a section where a sealing step is carried out, for sealing a paper packaging bag to which a sealing adhesive agent has been applied.

11 Claims, 12 Drawing Sheets

(51) Int. Cl.
   B65B 7/20      (2006.01)
   B65B 43/46     (2006.01)
   B65B 49/02     (2006.01)
   B65B 49/06     (2006.01)
   B65B 49/14     (2006.01)
   B65B 51/02     (2006.01)
   B65B 51/14     (2006.01)
   B29C 65/00     (2006.01)

(58) Field of Classification Search
   USPC ........ 53/370.5, 372.5, 375.5, 481, 482, 491,
                              53/568; 156/227, 443
   See application file for complete search history.

(56) References Cited

U.S. PATENT DOCUMENTS

| | | | |
|---|---|---|---|
| 2,669,815 A | | 2/1954 | Zinn, Jr. |
| 3,054,242 A | | 9/1962 | Harrison |
| 3,763,629 A | * | 10/1973 | Carlstrom ............... B65B 11/42 |
| | | | 53/372.2 |
| 3,861,123 A | * | 1/1975 | Eburn, Jr. ................. B65B 7/08 |
| | | | 53/370.5 |
| 3,982,376 A | * | 9/1976 | Ikeda ...................... B65B 43/30 |
| | | | 53/53 |
| 4,133,252 A | | 1/1979 | Eckstein |
| 4,507,906 A | | 4/1985 | Meyer |
| 6,295,790 B1 | | 10/2001 | McGregor |
| 6,324,818 B1 | * | 12/2001 | Morness ............... B65B 31/042 |
| | | | 53/284.7 |
| 8,443,578 B2 | | 5/2013 | Sargin |
| 8,826,959 B2 | * | 9/2014 | Files ....................... B32B 27/36 |
| | | | 156/443 |
| 8,850,778 B2 | | 10/2014 | Jansen |
| 9,233,502 B2 | | 1/2016 | Sargin |
| 2012/0225762 A1 | | 9/2012 | Sargin et al. |
| 2013/0031875 A1 | * | 2/2013 | Sargin ................... B65D 31/10 |
| | | | 53/479 |

FOREIGN PATENT DOCUMENTS

| | | |
|---|---|---|
| JP | 63-128037 U | 8/1988 |
| JP | 2004-167952 A | 6/2004 |
| JP | 2005313917 A | 11/2005 |
| JP | 2008-280087 A | 11/2008 |

OTHER PUBLICATIONS

Office Action of Japanese Patent Application No. 2014-220170 issued Feb. 19, 2018.
An office Action of the corresponding Canadian application No. 2883607 mailed Dec. 23, 2019.
An office Action of the corresponding Canadian patent application No. 2883607 mailed May 29, 2020.
An office Action of the corresponding Canadian Application No. 2883607 mailed Nov. 9, 2020.

* cited by examiner

*Fig. 9*
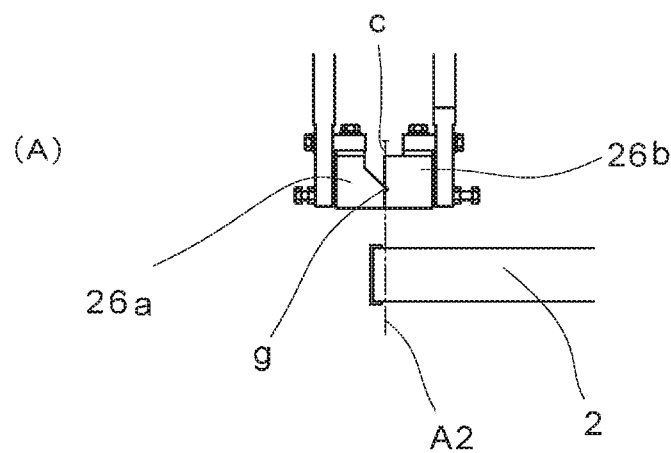
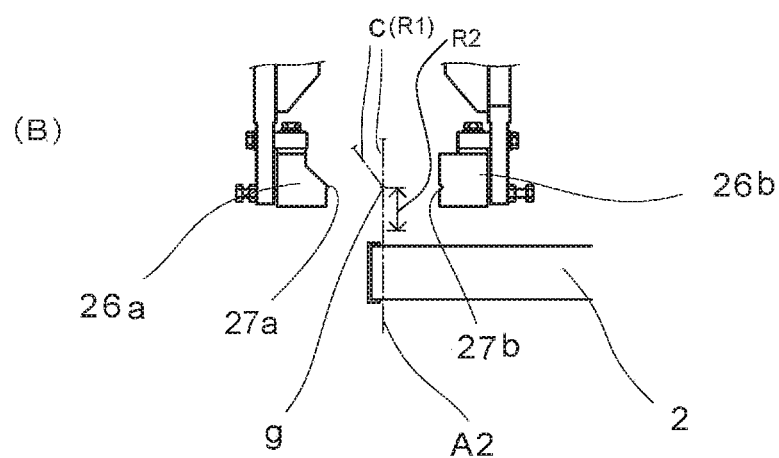
8ST

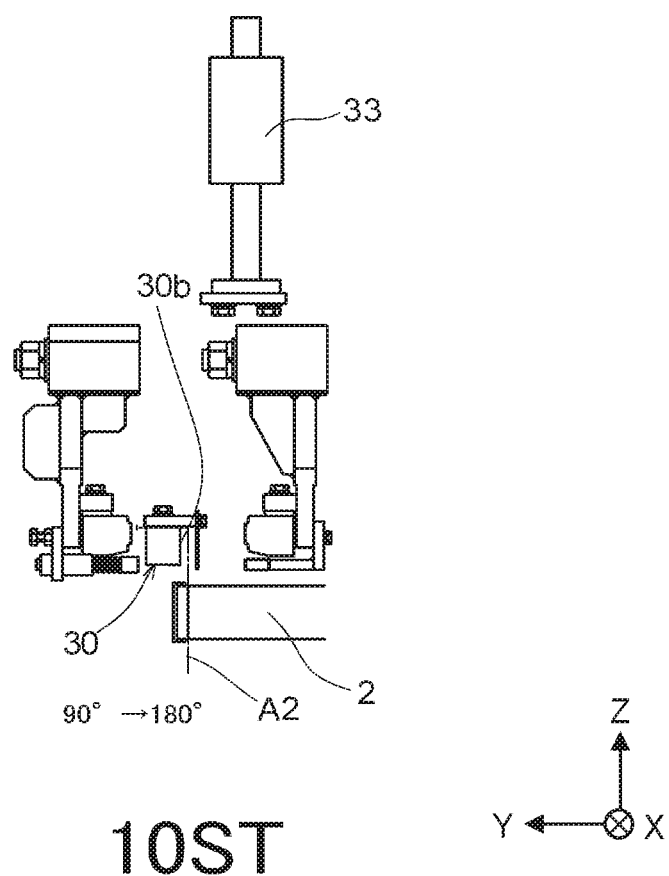

10-11ST

PACKAGING MACHINE

CROSS-REFERENCE TO RELATED APPLICATIONS

This application is a continuation-in-part of U.S. application Ser. No. 14/632,335 filed on Feb. 26, 2015, which is based on and claims priority to Japanese Patent Application No. 2014-220170 filed on Oct. 29, 2014, the disclosure of which is incorporated herein by reference.

BACKGROUND

1. Technical Field

The present disclosure relates to a packaging machine which fills a packaging bag with an article and seals the packaging bag, and more particularly to a packaging machine which can seal a paper packaging bag without occurrence of inclined seal in sealing the paper packaging bag.

2. Related Art

In filling a paper packaging bag with an article and then sealing the paper packaging bag, the paper packaging bag is filled with the article and thereafter, the paper packaging bag is carried out of a packaging machine Q by a conveyor 100 as shown in FIGS. 15 and 16. The paper packaging bag is then sealed by a paper packaging bag sealing machine 110 installed in a post-process line.

However, the paper packaging bag filled with the article is just placed on the conveyor 100 and is not held at portions thereof near a sealed part in sealing the paper packaging bag. This sometimes results in occurrence of inclined seal depending upon a state of the paper packaging bag.

SUMMARY

Therefore, an object of the present disclosure is to provide a packaging machine which can seal the paper packaging bag therein without occurrence of inclined seal in sealing the paper packaging bag.

The disclosure provides a packaging machine including a pair of grips holding vicinities of two sides of a bag mouth of a packaging bag, a moving body to intermittently moving the paired grips every one of a plurality of packaging steps, and a paper packaging bag sealing device provided in a section where a sealing step is carried out, for sealing a paper packaging bag to which a sealing adhesive agent has been applied.

According to the above-described construction, the vicinities of the sides of the bag mouth of the paper packing bag are held by the paired grips. Accordingly, the paper packaging bag can be sealed within the packaging machine without occurrence of the inclined seal in sealing.

The packaging machine may further include a resin packaging bag sealing device provided in the section where the sealing step is carried out, for sealing a resin packaging bag and a reciprocating member which reciprocates the paper packaging bag sealing device or the resin packaging bag sealing device. According to this construction, both the resin packaging bag and the paper packaging bag can be sealed by changing sealing devices.

The paper packaging bag sealing device may include a heater melting the sealing adhesive agent of the paper packaging bag. Consequently, the paper packaging bag can more reliably be sealed by melting the adhesive agent for sealing the paper packaging bag.

The paper packaging bag sealing device may include a fold guide folding a vicinity of the bag mouth of the paper packaging bag along a widthwise direction. Consequently, the paper packaging bag can more reliably be sealed by folding the paper packaging bag.

The fold guide may include a first fold guide folding a folded part of the paper packaging bag in a direction substantially perpendicular to a lengthwise direction and a second fold guide folding the folded part folded by the first fold guide in the direction substantially perpendicular to the lengthwise direction, in a direction horizontal to the lengthwise direction. Since the fold guide include the first fold guide and the second fold guide, the paper packaging bag can more reliably be sealed by being folded in a stepwise manner.

The heater may have a hot air supply block disposed near the first fold guide. According to this construction, hot air is blown from the hot air supply block against the folded part and the surface side packaging paper to both of which the adhesive agent is applied, with the paper packaging bag being folded by the first fold guide, so that the adhesive agent can be melted immediately before sealing, with the result that the paper packaging bag can reliably be sealed.

The packaging machine may further include a pair of clamping parts provided in a section where a sealing step is carried out, the clamping parts clamping the paper packaging bag from a surface and a back thereof respectively thereby to form a fold line. In the packaging machine, one of the clamping parts may have a fold line forming protrusion and the other clamping part may have a fold line forming recessed streak brought into mesh engagement with the protrusion. According to this construction, since the fold line is formed on the paper packaging bag by the paired clamping parts, the folding can be rendered easy and reliable with the result that sealing can be rendered more reliable.

The paper packaging bag sealing device may have a pair of clamping bodies configured to clamp the paper packaging bag from a surface and a back thereof respectively thereby to press the surface and the back of the paper packaging bag against each other. According to this construction, the paper packaging bag is clamped by the paired clamping bodies, so that the surface and the back of the paper packaging bag are pressed against each other. Consequently, the paper packaging bag can reliably be sealed.

The paired clamping bodies may comprise a pair of pressing rollers. Consequently, the paper packaging bag can reliably be sealed during movement by a simple structure.

A step of sealing the paper packaging bag may include a step of forming a fold line on the paper packaging bag, a step of melting the sealing adhesive agent for the paper packaging bag, a step of widthwise folding a vicinity of the bag mouth of the paper packaging bag and a step of clamping the paper packaging bag from a surface and a back thereof, thereby pressure bonding the paper packaging bag. Consequently, the paper packaging bag can reliably be sealed through the fold line forming step, the sealing adhesive agent melting step, the folding step and the pressure bonding step.

Further, the application discloses another aspect of the invention. That is a packaging machine for sealing a paper packaging bag (A2), which is made of paper, comprising: a pair of grips (2) that grip vicinities of two lateral sides of a bag mouth (a) of the paper packaging bag such that the paper packaging bag is held in a vertical direction (Z) in a suspended manner with the grips, wherein the paper packaging bag has two surfaces that are opposed each other in a depth direction (Y), which is horizontal and perpendicular to the vertical direction, an adhesive region (b), over which a sealing adhesive agent spreads, is provided on the front surface of the paper packaging bag, being positioned above the grips, and no adhesive region is provided on the back surface of the paper packaging bag, and a side on which the adhesive region is provided is defined as a front side (+Y) of the paper packaging bag with respect to the depth direction, and the other side on which no adhesive region is provided is defined as a back side (−Y) of the paper packaging bag, a moving body (3) that intermittently moves the grips along a carrying path from an upstream side to a downstream side in a carrying direction (X) such that the paper packaging bag is carried in the carrying direction, wherein the carrying direction is perpendicular to the depth direction and vertical direction, a bag length (LA2) of the paper packaging bag is determined in the carrying direction, and seen from the carrying direction, the adhesive region is determined to be oriented at 0°, a sealing device (4) that is configured with a clamp forming part, a first fold guide, a heater, a second fold guide and a clamp sealing part in order to seal the bag mouth, wherein the clamp forming part (26a, 26b) is composed with a pair of streaks that are a protrusion streak (27a) and a recessed streak (27b) to form a fold line (g) in the adhesive region, wherein the protrusion streak (27a), which extends in the carrying direction, is in a protrusion shape and is arranged at the front side of the paper packaging bag, facing the front surface of the paper packaging bag, and the recessed streak (27b), which extends in the carrying direction, is in a recess shape and is arranged at the back side of the paper packaging bag, facing the back surface of the paper packaging bag in order to mate with the protrusion streak while pinching the paper packaging bag, the protrusion streak and the recessed streak have a length corresponding to the bag length (LA2) of the paper packaging bag, are arranged above the grips and to be parallel to a height of these grips such that the fold line, which is formed with the protrusion and recessed streaks, extends parallel to the carrying direction, making it easy for an upper region of the adhesive region to bent toward the front side, the upper region (R1) being defined as a region above the fold line in the adhesive region, and the remaining of the adhesive region being defined as a remaining region (R2), the first fold guide (28) is arranged at a downstream side from the cramp forming part in the carrying direction, and is composed with a first inclined face ( 28a) and a first under face (28b and 28c), which is continuously connected to the first inclined face in the carrying direction, wherein the first inclined face is arranged over the carrying path to make a contact with the upper region of the adhesive region as the paper packaging bag is carried in the carrying direction, the first inclined face having a back edge (28be) and a front edge (28fe) with respect to the depth direction (Y), when seen from the carrying direction, the back edge and the front edge are respectively positioned at the back side and the front side of the paper package bag, and the first inclined face is configured to fold the upper region (R1) from 0° toward the front side up to 90°, when being seen from the upstream side in the carrying direction and counts in an anti-clockwise direction, as the paper packaging bag runs thereunder by the back surface of the upper region being pressed with the first inclined face, the first under face is in a flat plane extending horizontally and facing downward (−Z) and is positioned at the same height as the protrusion streak (27a) and a recessed streak (27b) such that the upper region, which has been folded at 90° by the first inclined face, maintains its folded shape as the paper packaging bag runs thereunder, wherein the first under face is composed with an upstream under face (28b) and a downstream under face (28c), which follows the upstream under face in the carrying direction, and, seen from the depth direction, the upstream under face and the downstream under face are respectively positioned at an upstream side and a downstream side in the carrying direction from a most-downstream point (P28x) of the first inclined face, which is defined in the carrying direction, the heater (29) that is arranged at a downstream side from the first inclined face, having a hot air supply block (29a) through which a hot air blows wherein the hot air supply block is disposed below the first under face to blow the hot air toward the first under face such that the upper region folded at 90° is heated with the hot air while carried under the first under face, the second fold guide (30) is arranged at a downstream side from the first under face in the carrying direction, and is composed with a second inclined face (30a) and a second side face (30b), which is continuously connected to the second inclined face in the carrying direction, wherein the second inclined face is arranged lower than the first inclined face and configured to fold the upper region (R1) from 90° up to 180°, which is seen from the upstream side in the carrying direction and counts in the anti-clockwise direction, as the paper packaging bag runs thereunder by the back surface of the upper region being pressed with the second inclined face, the second side face (30b) is in a flat plane, arranged in parallel to face the remaining region of the adhesive region and positioned at the front side such that the upper seal region, which has been folded at 180° by the second inclined face, maintains its folded shape as the paper packaging bag runs thereunder, the clamp sealing part is arranged at a downstream side from the second fold guide, and composed with a pair of clamping bodies (31a, 31b), one of which being at the front side and the other of which being at the back side such that the clamping bodies press the upper region, which has been folded at 180° and the remaining region and seal these regions.

BRIEF DESCRIPTION OF THE DRAWINGS

In the accompanying drawings:

FIG. 9 is a schematic right side view of the packaging machine, showing an eighth process;

FIG. 12 is a schematic right side view of the packaging machine, showing a tenth process;

DETAILED DESCRIPTION

Figure 1:
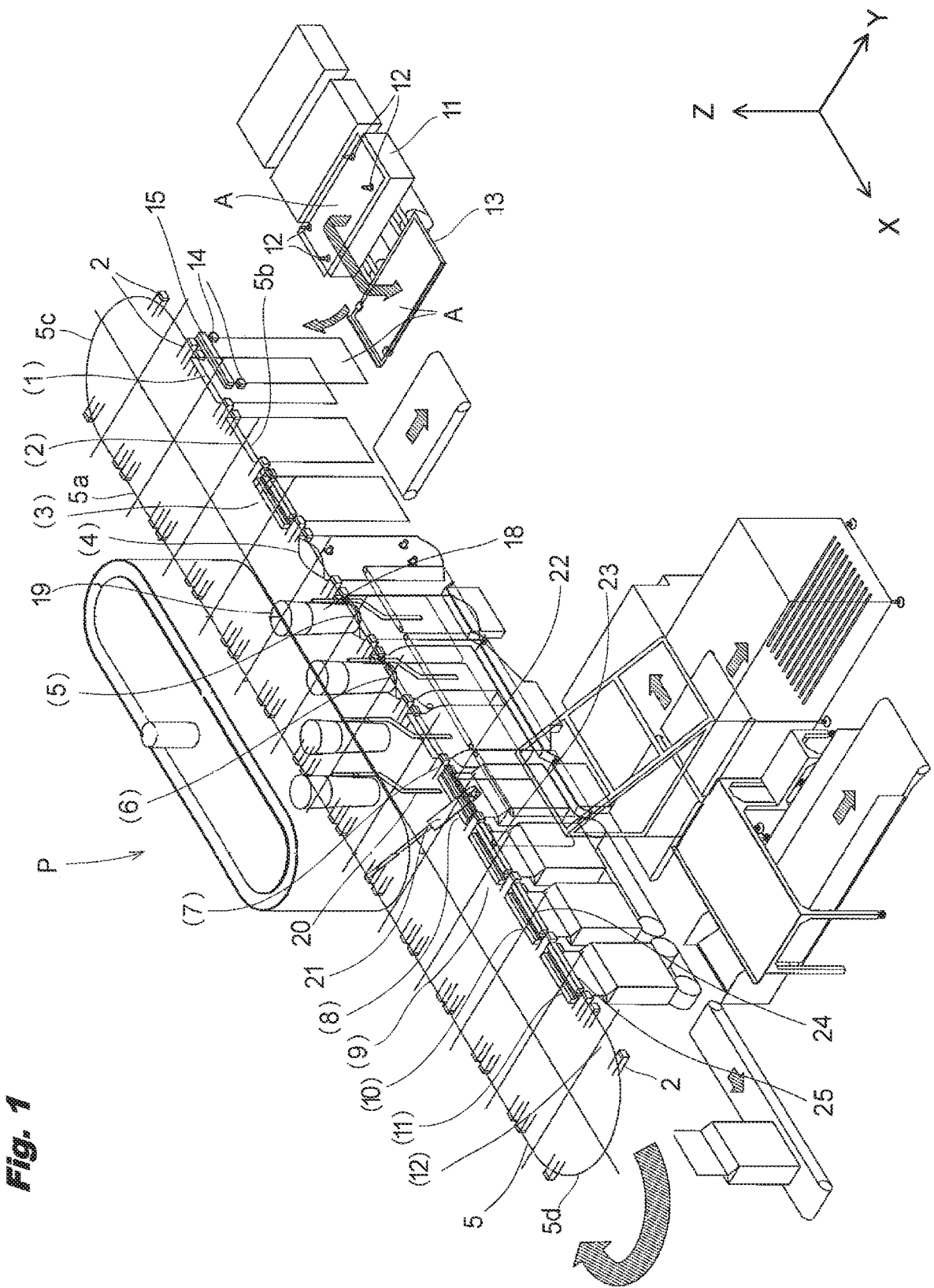
FIG. 1 is a schematic perspective view of a packaging machine according to one embodiment.

According to one embodiment, a packaging machine includes a pair of grips 2 holding vicinities of two opposite parts of a bag mouth a of a paper packaging bag A2, a moving body 3 configured to intermittently move the paired grips 2 in every one of a plurality of packaging steps, and a paper packaging bag sealer 4 configured to seal the paper packaging bag including a part in which a sealing step is to be carried out and to which a sealing adhesive b has been applied, whereby the paper packaging bag can be sealed in the machine without an occurrence of inclined seal.

In the application, a direction in which the bag is carried is termed as a carrying direction (X). The forwarding direction means+X direction and the backward direction, which is opposite to the forwarding direction, means−X direction. A direction in which the bag is held/suspended with the grips is termed as Z direction. The upward means+Z direction. The downward means−Z direction. A direction, perpendicular to X and Y direction, is termed as Y direction. In FIG. 9, a direction from left to right means+Y direction, and the opposite direction means−Y direction. The X-Y-Z dimensions are shown in the drawings.

An embodiment will be described with reference to FIGS. 1 to 13. A packaging machine P of the embodiment includes a pair of grips 2 holding vicinities of two opposite parts of a bag mouth a of a paper packaging bag A2, a moving body 3 configured to intermittently move the paired grips 2 in every one of a plurality of packaging steps, and a paper packaging bag sealer 4 configured to seal the paper packaging bag A2 including a part in which a sealing step is to be carried out and to which a sealing adhesive b has been applied, whereby the paper packaging bag A2 can be sealed in the machine without an occurrence of inclined seal. The paired grips 2, the mobbing body 3 and the paper packaging bag sealer 4 will be described in detail in the following. A length of the bag A2 in the lateral direction (or X direction/carrying direction) is denoted with LA2, which is termed as a bag length.

The packaging machine P of the embodiment is configured to fill a gusset bag with an article such as pet food and then seal the gusset bag. The gusset bag is formed with a zipper f (see (B) of FIG. 2) near a bag mouth a. The gusset bag may be a large bag having a length of 600 to 1050 mm, a width of 300 to 50 mm and a thickness of 50 to 80 mm. The article should not be limited to the pet food but may include a granular material such as rice or fertilizer or a powdery material such as wheat flour.

In the packaging machine P, a number of moving bodies 3 (see FIG. 5) are horizontally moved along an annular passage 5 including two linear sections 5a and 5b and two semicircular sections 5c and 5d located at opposite ends of the linear sections 5a and 5b respectively, as shown in FIG. 1. More specifically, the moving bodies 3 are intermittently moved in every one of packaging steps (1) to (12) so that a packaging bag A supported by a pair of grips 2 in a suspended manner with a bag mouth a up is filled with an article and then sealed. All the steps (1) to (12) from a step of supplying bags A to a step of discharging products out of the packaging machine are arranged at one 5b of the linear sections constituting the annular passage 5.

Figure 5:
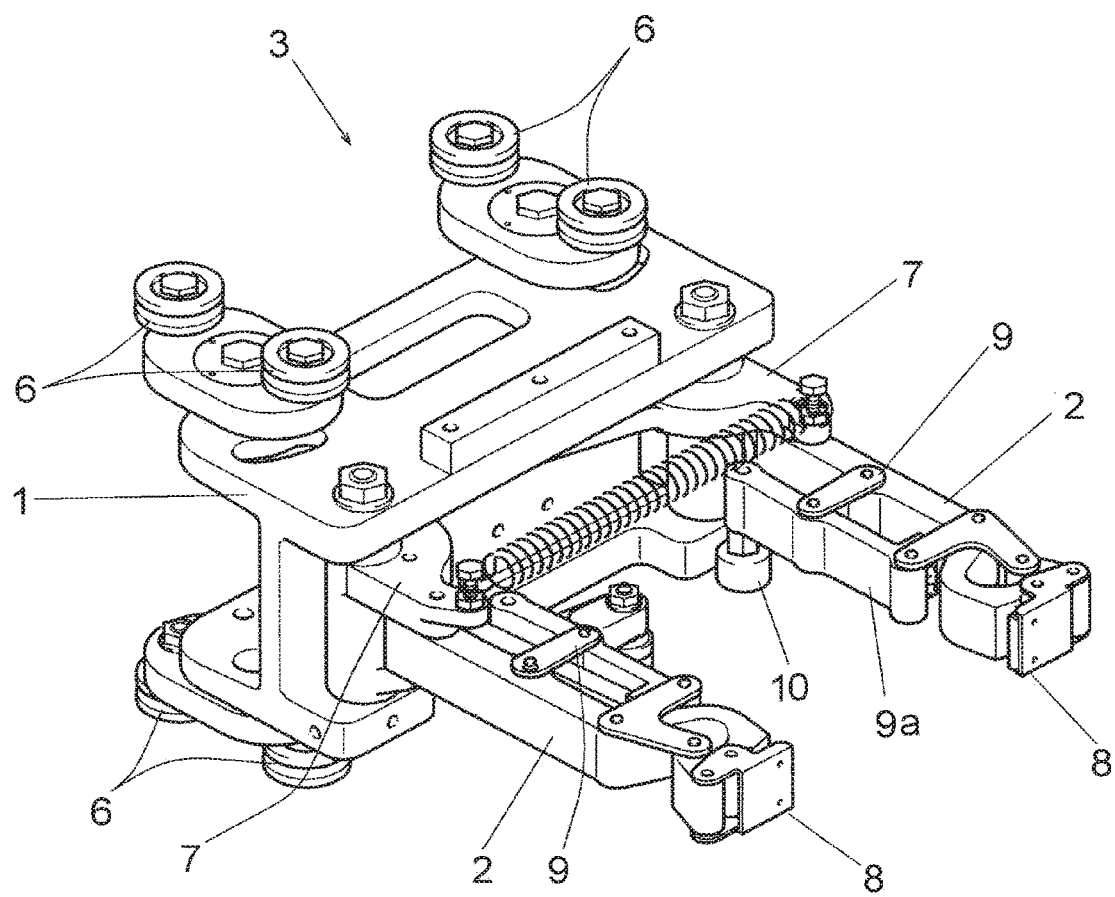
FIG. 5 is a perspective view of a moving body.
Figure 6A:
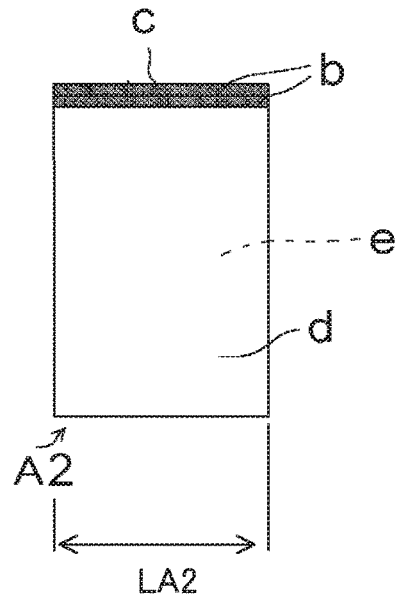
FIGS. 6A and 6B are a front view of a paper packaging bag and a perspective view of the paper packaging bag respectively.
Figure 6B:
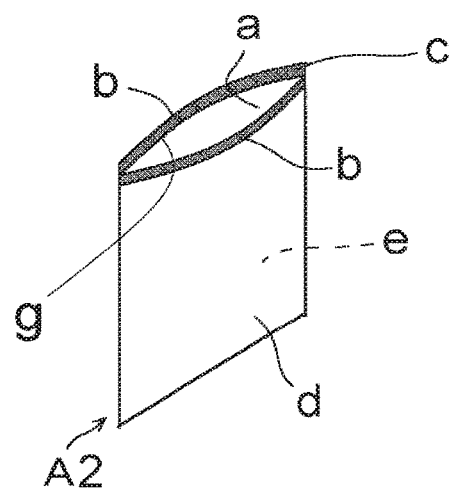

The paired grips 2 are configured to hold vicinities of two opposite parts of a bag mouth a of a paper packaging bag A2 and are mounted on the moving body 3 to be intermittently moved with the moving body 3 in every packaging step, as shown in FIG. 5. More specifically, the moving body 3 includes a base 1 on which a plurality of sets of rollers 6 is rotatably mounted. The rollers 6 are attached to rails (not shown) forming the annular passage 5. The base 1 is mounted to an annular conveyor belt (not shown) driven by a known intermittent drive unit (not shown) including an indexing mechanism and an electric motor.

A pair of right and left holders 7 are pivotally mounted on the base 1 of the moving body 3 as shown in FIG. 5. The paired grips 2 are mounted on the holders 7 respectively. Rollers 10 are fixed to operating rods 9a of link mechanisms 9 respectively. The rollers 10 are rotated by moving pressing members (not shown) forward and backward by a cam mechanism (not shown) which is controlled by a known drive unit, so that packaging bag clamping parts 8 of the grips 2 are opened and closed, respectively.

Figure 2:
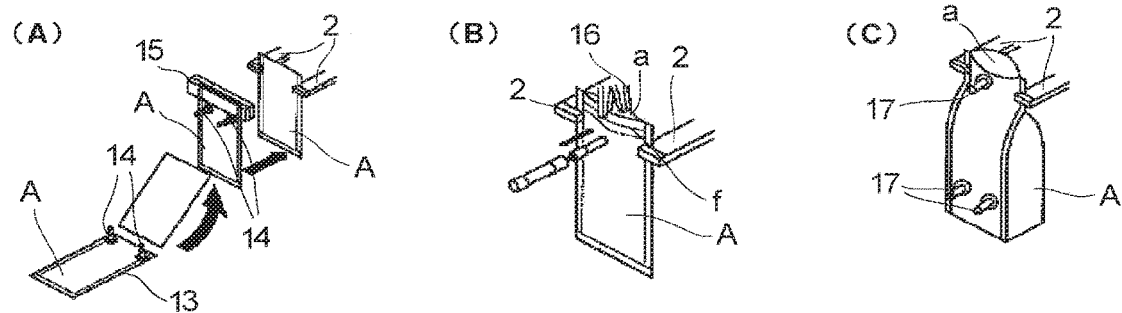
FIG. 2 is an illustration diagram of the packaging machine in a packaging step.
Figure 3:
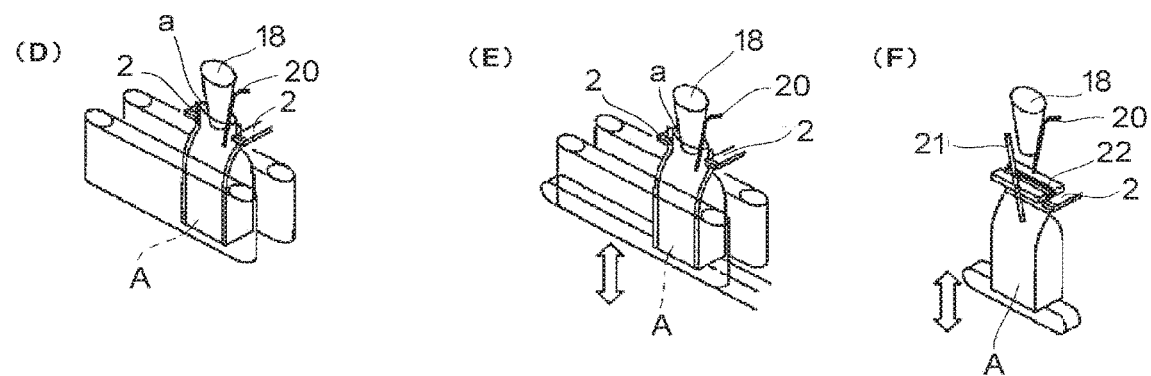
FIG. 3 is also an illustration diagram of the packaging machine in the packaging step.
Figure 4:
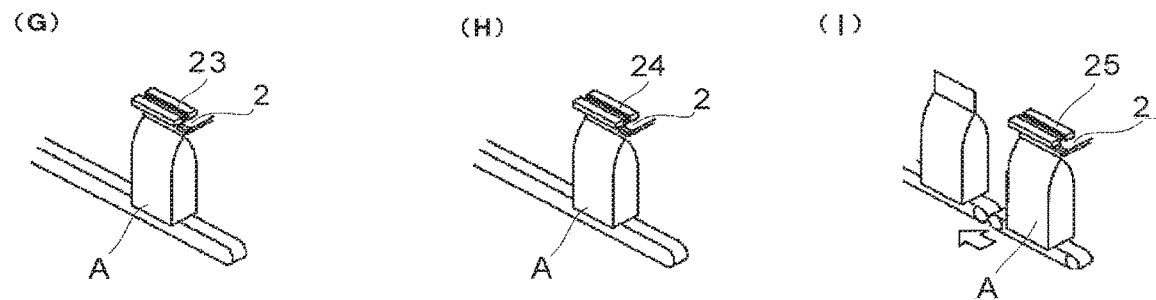
FIG. 4 is further an illustration diagram of the packaging machine in the packaging step.

The packaging bag A includes a resin-made packaging bag A1 and a paper-made packaging bag A2. The packaging machine P is configured to fill either the resin-made packaging bag A1 or the paper-made packaging bag A2 with the article and then seal the bag within the machine. When the resin-made packaging bag A1 is filled with the article by the packaging machine P, the article (pet food) is packaged through a bag feeding step (1), a printing/printing quality inspecting step (2), an unzipping and one-side grip checking step (3), a bag opening/inflating step (4), a filling step (5), a vibrating/gas filling step (6) and (7), a deaeration/temporarily sealing step (8), a first sealing and outside discharging step (9), a second sealing step (10), a cooling/discharging step (11) and a product discharging step (12), as shown in FIGS. 2 to 4.

More specifically, the packaging bag A (the resin-made packaging bag A1, in this case) is supplied to the paired grips 2 in the bag feeding step (1). The bag feeding step (1) includes a step of separating one of packaging bags A loaded on a bag magazine 11 by a separating mechanism including suction discs 12, a step of holding the separated packaging bag A by a horizontal transfer unit and transferring the separated packaging bag to a bag placing section 13, a step of correcting a position of the packaging bag A transferred to the bag placing section 13, a step of transferring to a holding unit 15 the packaging bag A held by a pivot arm provided with suckers 14 and a step of transferring the packing bag A from the holding unit 15 to the paired grips 2 after execution of height calibration of the packaging bag A during transfer to the paired grips 2.

In the printing/printing quality inspecting step (2), an expiration date and the like are printed on the packaging bag A by an ink jet printer (IJP) and a printing quality inspection is carried out by a printing quality inspecting camera. In the chuck opening and one-side grip checking step (3), the chuck f is opened, and it is checked whether or not the paired grips 2 has occurred one-side grip. The chuck f near the mouth a of the packaging bag A is opened by a claw 16 as shown in (B) of FIG. 2. Further, one or more packaging bags which have failed in printing or which contain printing failure such as character missing have been excluded from the packaging machine at this step.

In the opening/inflating step (4), the mouth a of the packaging bag A is opened so that the packaging bag A is inflated. An upper end and a lower end of the packaging bag A are adsorbed to suckers 17 with the result that the packaging bag A is expanded, as shown in (C) of FIG. 2. In the filling step (5), the packaging bag A is filled with pet food. A movable funnel 18 is inserted through the mouth a of the packaging bag A suspended by the paired grips 2, so that pet food is supplied through the movable funnel 18 and a fixed funnel 19 (see FIG. 1) into the packaging bag A, as shown in (D) of FIG. 3. The packaging bag A is simultaneously shaped.

In the vibrating/gas filling step (6) and (7), the packaging bag A filled with the pet food is vibrated to be shaped and is filled with nitrogen. A nitrogen gas is supplied from a gas filling nozzle 20 into the packaging bag A and the packaging bag A is shaped, as shown in (E) of FIG. 3. In the deaeration/temporarily sealing step (8), the packaging bag A is deaerated and a part of the packaging bag A located near the bag mouth a is temporarily sealed. A deaerating nozzle 21 is inserted through the bag mouth a into the packaging bag A so that extra air is removed from the packaging bag A, as shown in (F) of FIG. 3. Thereafter, the part of the packaging bag A located near the bag mouth a is clamped by a temporal sealing device to be temporarily sealed.

In the first sealing and outside discharging step (9), a first seal is applied to the part of the packaging bag A located near the bag mouth a by a first sealing device 23 as shown in (G) of FIG. 4. Further, one or more packaging bags which fail to be opened and inflated are not filled with pet food and in which metal bodies are found, and the like are discharged outside the system. In the second sealing step (10), a second seal is applied to the part of the packaging bag A located near the bag mouth a. The part of the packaging bag A located near the bag mouth a is heat-sealed by a second sealing device 24 as shown in (H) of FIG. 4.

In the cooling/outside discharging step (11), a sealed part is cooled and one or more packaging bags defective in seal and the like are discharged outside the system. The sealed part near the bag mouth a is cooled by a cooling bar 25 as shown in (I) of FIG. 4. Further, in the product discharging step (12), the packaging bag S filled with the article (pet food) and sealed is discharged outside the packaging machine.

On the other hand, when the paper packaging bag A2 is filled with an article to be packaged by the packaging machine P, the packaging machine P performs the bag feeding step (1), the printing/printing quality inspecting step (2), the unzipping and one-side grip checking step (3), the bag opening/inflating step (4), the filling step (5), the vibrating/gas filling step (6) and (7) and the product discharging step (12) in the same manner as described above. However, the case of filling the paper packaging bag A2 differs in the eighth to eleventh steps (8) to (11) from the case of filling the packaging bag A.

Figure 10:
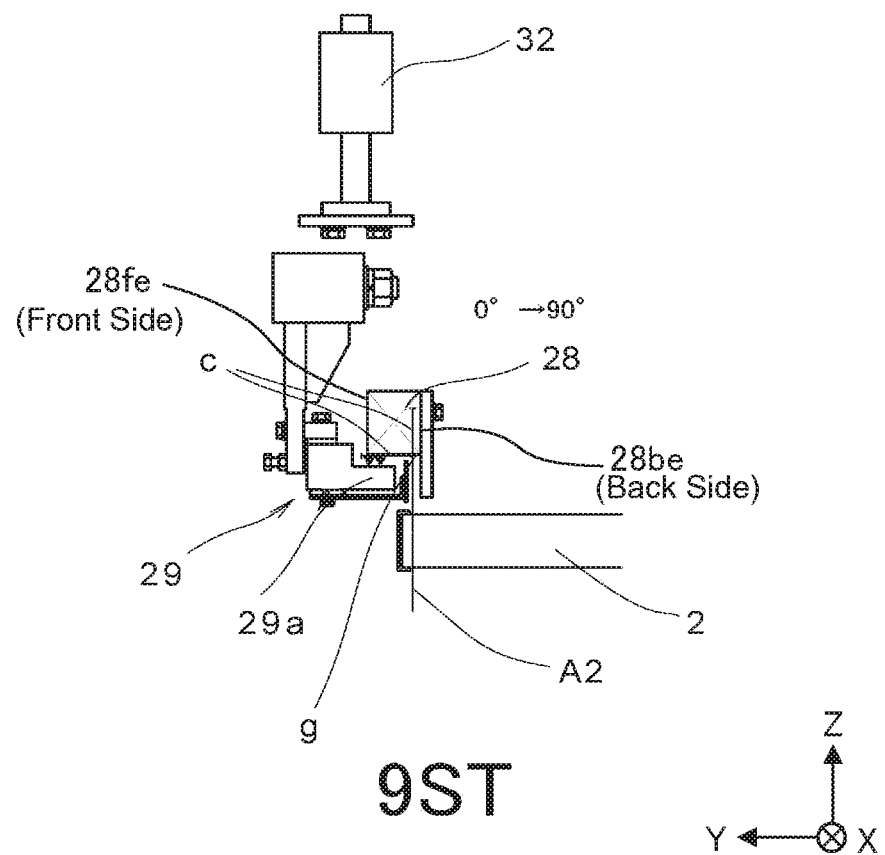
FIG. 10 is a schematic right side view of the packaging machine, showing a ninth process.

The following will describe the eighth to eleventh steps and the construction of the packaging machine P relating to the eighth to eleventh steps. The paper packaging bag A2 used to package the article in the embodiment is formed so that a back side packaging paper e is longer than a surface side packaging paper d by the length (the height) of a folded part c. A sealing adhesive agent b is applied to both an inner surface of the folded part c (or upper region R1) and a part (remaining region R2) of packaging bag A2 against which the 180-degree folded part c abuts. Upper region R1 and remaining region R2 are shown in FIG. 10. In the drawing, the upper region is folded to 90° (Y direction). The remaining part stands upright (Z direction).

When the paper packaging bag A2 is filled with the article and sealed by the packaging machine P, the eighth to eleventh steps are a seal step in which are carried out a step of forming a fold line on the paper packaging bag A2, a step of melting the sealing adhesive agent b for the paper packaging bag A2, a step of widthwise folding the vicinity of the bag mouth a of the paper packaging bag A2 and a step of clamping the paper packaging bag A2 from surface and back sides thereby pressure bonding the paper packaging bag A2. The paper packaging bag A2 can reliably be sealed through these steps.

A pair of clamping parts 26a and 26b are provided in a section where the eighth step (8) is carried out, for the purpose of clamping the paper packaging bag A2 from surface and back sides thereby to form the fold line g, as shown in FIG. 9. One of the clamping parts 26a and 26b has a fold line forming protrusion 27a, and the other clamping member 26b or 26a has a fold line forming recessed streak 27b which is brought into mesh engagement with the protrusion 27a.

The fold line g is formed widthwise with respect to the paper packaging bag A2 so as to cross a lower side of the folded part c of the back side packaging paper e. Accordingly, the paired clamping parts 26a and 26b are held by the paired grips 2 to be moved to the section where the eighth step (8) is carried out to be located so that the fold line g is formed on the lower side of the folded part c of the back sided packaging paper e, as shown in (B) of FIG. 9. The fold line g is thus formed by causing the clamping parts 26a and 26b to come close to the surface and back sides of the paper packaging bag A2 respectively and clamping the paper packaging bag A2, so that the fold line g is formed. This can fold the folded part c easily and reliably with the result that the paper packaging bag A2 can reliably be sealed.

Figure 7:
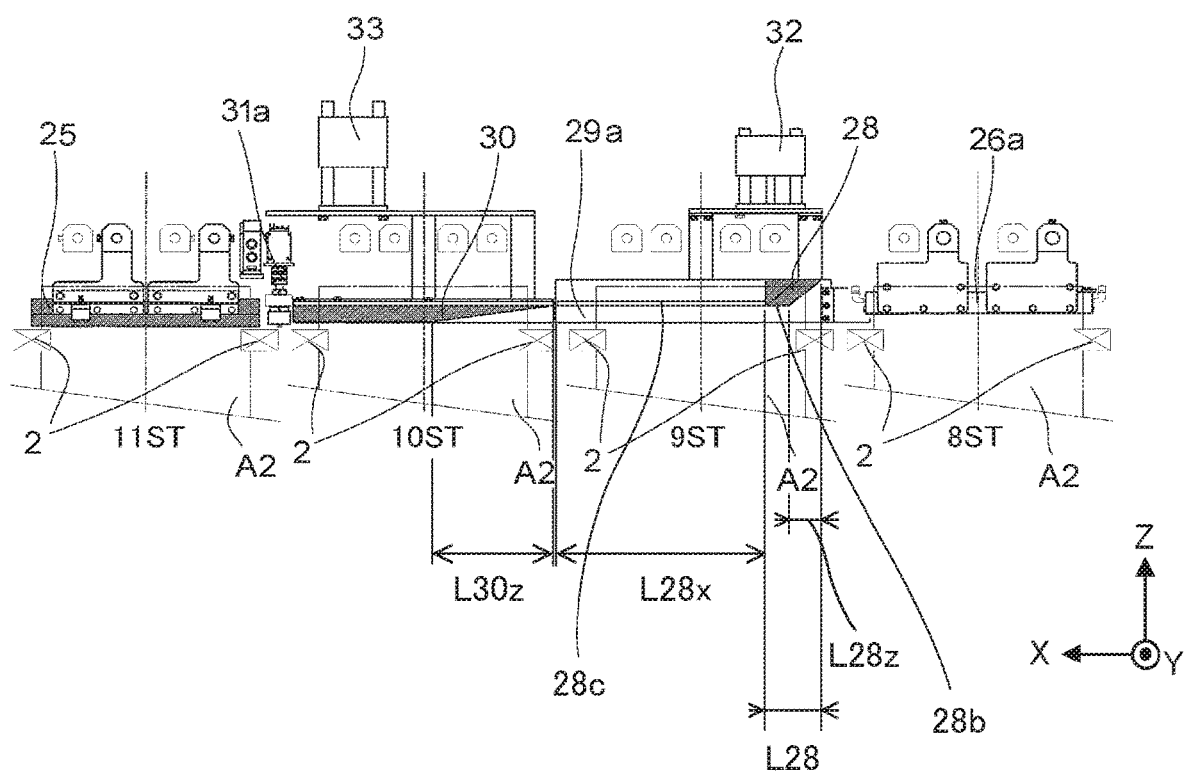
FIG. 7 is a schematic front view of the packaging machine, showing a paper packaging bag sealing step.
Figure 8:
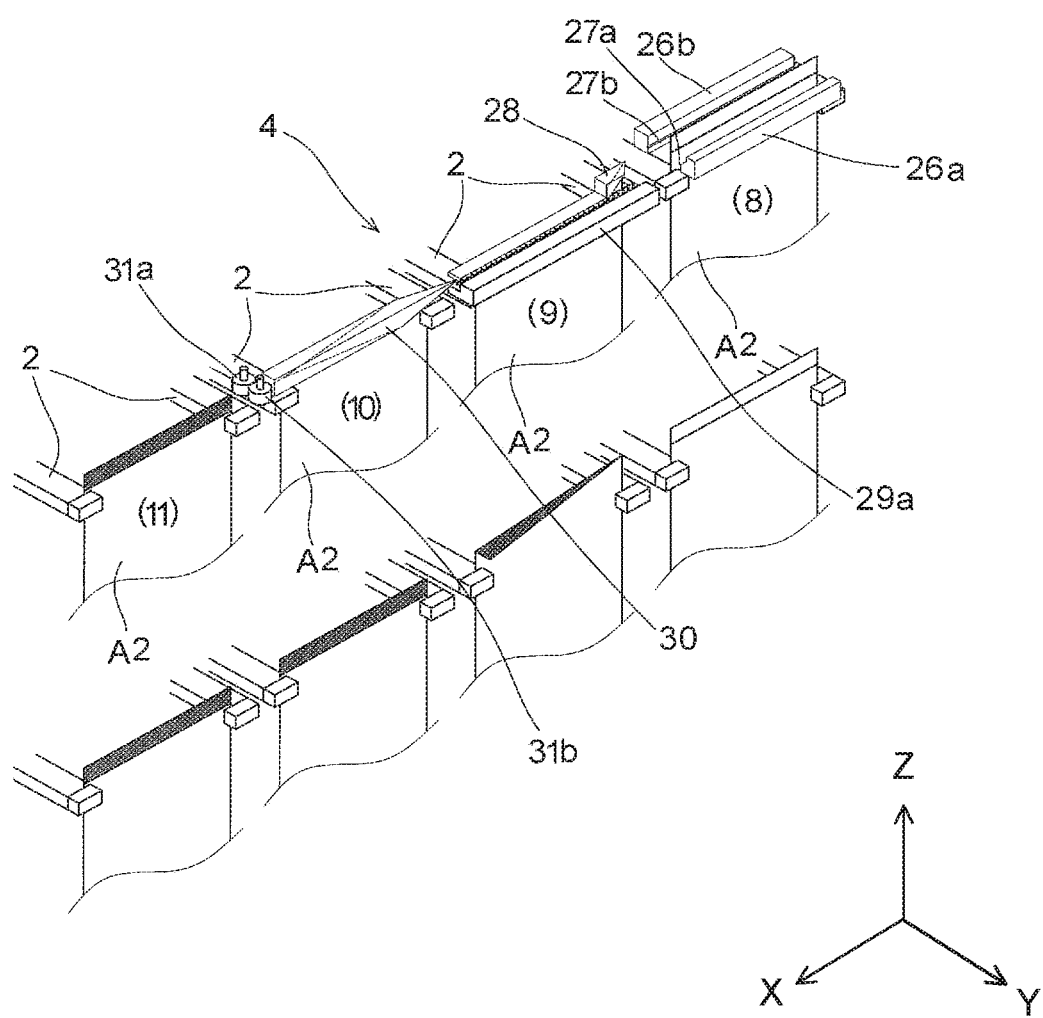
FIG. 8 is a schematic perspective view of the packaging machine, showing the paper packaging bag sealing step.

A paper packaging bag sealing device 4 is provided in a section where the ninth to eleventh steps (9) to (11) are carried out, for the purpose of sealing the paper packaging bag A2 to which the sealing adhesive agent b has been applied, as shown in FIG. 7 or 8. The sealing device 4 is disposed within the packaging machine P to seal the paper packaging bag A2 with both ends near the bag mouth a being held by the paired grips 2, so that the paper packaging bag A2 can be sealed without occurrence of an inclined seal in sealing the paper packaging bag A2.

Figure 11A:
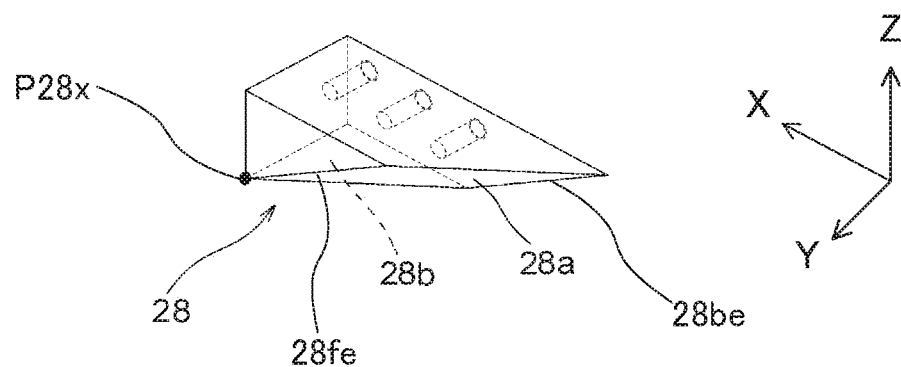
FIGS. 11A and 11B are a perspective view and a plan view of a first folding guide of the packaging machine respectively.
Figure 11B:
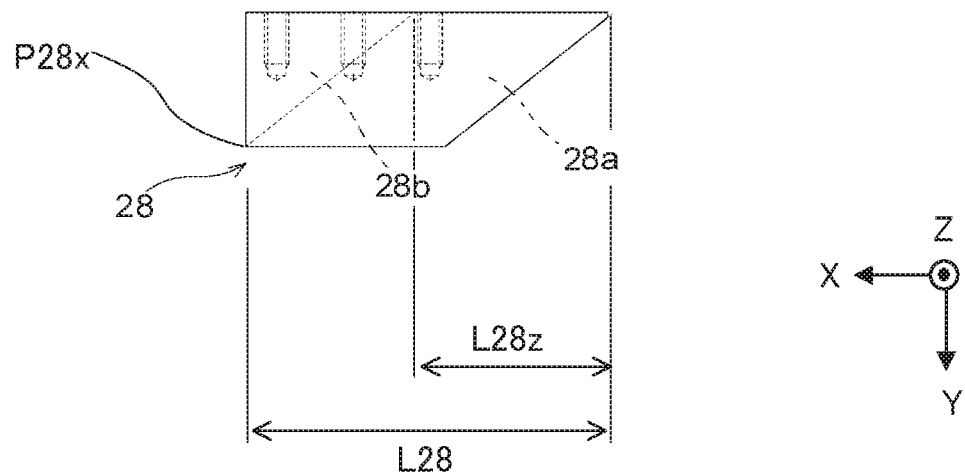

The paper packaging bag sealing device 4 includes a first fold guide 28, a heater 29, a second fold guide 30 and a pair of clamping bodies 31. The fold guide 28 is provided near the upstream of a section where the ninth step (9) is carried out, as shown in FIG. 7 or 8. The fold guide 28 is configured to fold the folded part c along the fold line g in a direction substantially perpendicular to the lengthwise direction of the paper packaging bag A2. More specifically, the fold guide 28 is formed into a block body provided with an inclined surface 28a (or first inclined face) as shown in FIGS. 11A and 11B. When moved to the section where the ninth step (9) is carried out, the paper packaging bag A2 held by the paired grips 2 is brought into contact with the inclined surface 28a thereby to be gradually folded 90 degrees along the fold line g by an underside 28b.

The first inclined face has two lateral edges in the depth direction (Y), both of edges extending in the vertical direction (X). As shown in FIG. 10, back edge 28be is arranged at the right side (or back side) from bag A2. On the other hand, front edge 28fe is arranged at the left side (or front side) from bag A2. As shown in FIG. 11B, the first inclined face has first inclined length L28 and initial length L28z. Length 28 means a maximum length in the carrying direction, which is from a most upstream point to a most downstream point (P28x) thereof. Initial length L28z means a length from the most upstream point to a most downstream point of the back edge 28be. The initial length L28z is shown in FIG. 11B. Further, the first fold guide 28 includes first under face, which is a flat plane extending horizontally and facing downward. The first under face is configured to keep the folded part (c) at 90° by pressing the back surface of the upper region (R1) down. More specifically, the first under face is composed with two under faces, which are upstream and downstream under faces (28b and 28c). The upstream under face is denoted with 28b and shown in FIGS. 11A and 11B. The face is a transitional section following the first inclined face, having a triangle shape from the top view (Z-direction), see FIG. 11B. The upstream edge of the upstream under face meets the downstream edge of the first inclined face. With respect to the most downstream point (P28x) of the first inclined face, the upstream under face is positioned at the upstream side in the carrying direction. The downstream under face is denoted with 28c and shown in FIG. 7. The face follows the upstream under face. The upstream edge of the downstream under face meets the downstream edge of the upstream under face. With respect to the most downstream point (P28x) of the first inclined face, the downstream under face is positioned at the downstream side in the carrying direction. These under faces (28b and 28c) are preferably arranged at the same height in the vertical direction (Z). A first under length of the downstream under face is denoted with L28x, see FIG. 7. The first inclined face is in a flat plane of which a normal line is oriented downward (−Z) with respect to the vertical direction, toward the front side (+Y) with respect to the depth direction and rearward (−X) with respect to the carrying direction.

Further, the heater 29 is provided in the section where the ninth step (9) is carried out, for the purpose of melting the sealing adhesive agent b of the paper packaging bag A2 as shown in FIG. 10. The heater 29 has a 29a which is disposed along a movement direction of the paper packaging bag A2 held by the paired grips 2 so as to be located below the first fold guide 28. As a result, hot air is blown from the hot air supply block 29a against the folded part c and the surface side packaging paper d to both of which the adhesive agent b is applied, with the paper packaging bag A2 being folded 90 degrees by the first fold guide 28, so that the adhesive agent can be melted immediately before sealing, with the result that the paper packaging bag A2 can reliably be sealed.

Figure 13A:
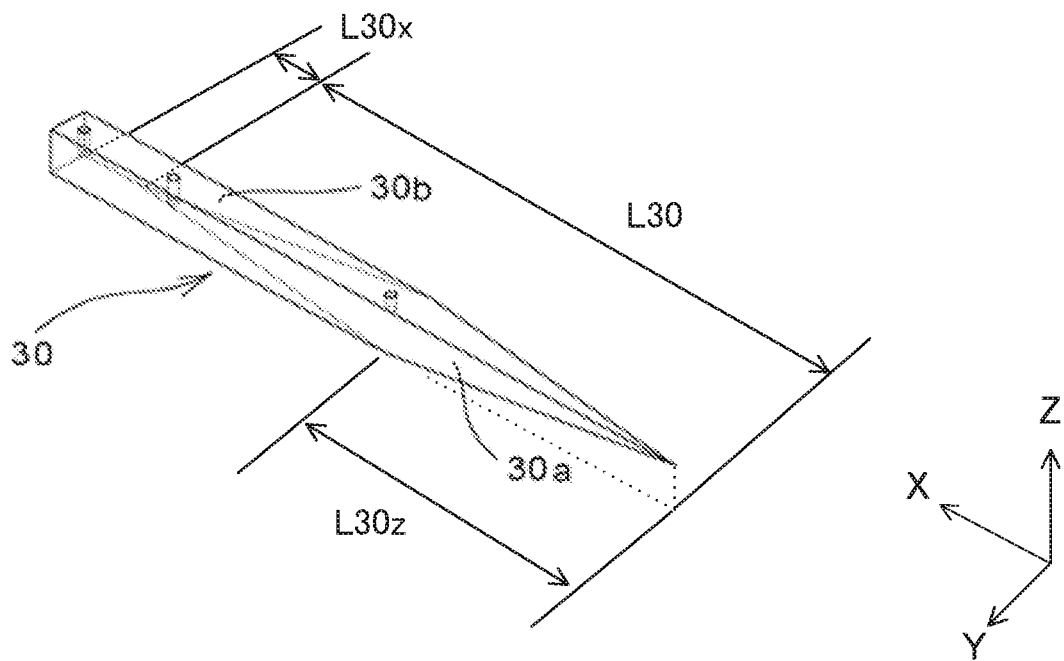
FIGS. 13A and 13B are a perspective view and a front view of a second folding guide of the packaging machine respectively.
Figure 13B:
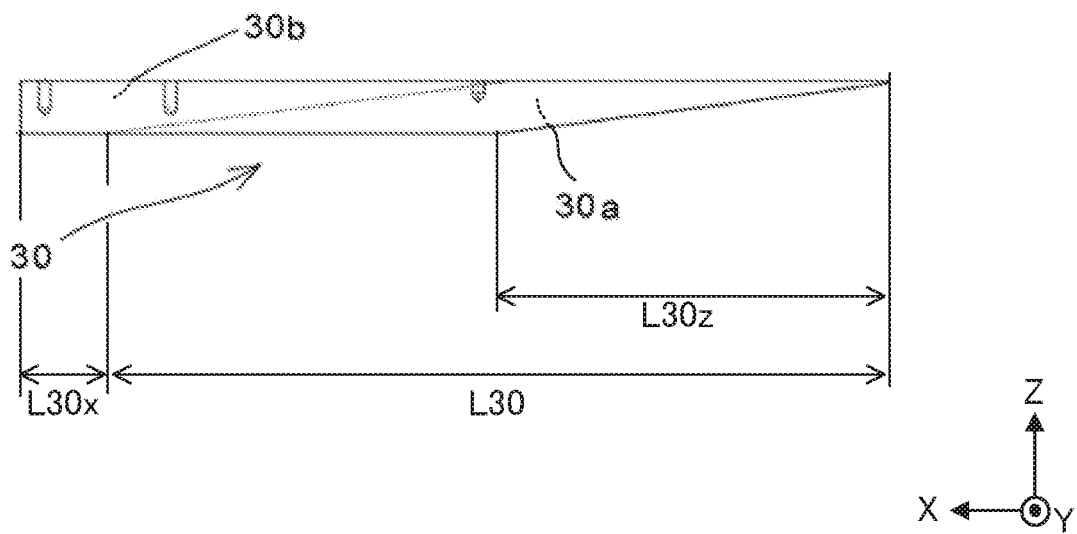

The second fold guide 30 is provided in the section where the tenth step (10) is carried out, as shown in FIG. 7 or 8. The second fold guide 30 is configured to fold the folded part 6 of the paper packaging bag A2 along fold line g in the horizontal direction relative to the lengthwise direction. More specifically, the second fold guide 30 is formed into a block body provided with an inclined surface 30a as shown in FIGS. 13A and 13B. When moved to the section where the tenth step (10 is carried out, the paper packaging bag A2 held by the paired grips 2 is brought into contact with the inclined surface 30a thereby to be gradually folded 90 degrees (180 degrees in total) along the fold line g by a side surface 30b.

The second inclined face has second inclined face 30a and second side face 30b. The second inclined face is arranged lower than the first inclined face, configured to further fold the upper region (R1) of the adhesive region to 180°. More specifically, a leading edge of the second inclined face (most upstream edge) is disposed preferably at the same height as the first lower face 28c such that the 90° folded part is able to smoothly conveyed to the second fold guide. In order to keep the 180° folded upper region in such a shape, the second side face is arranged at the front side (or left side shown in FIG. 12). A second inclined length of the second inclined face is denoted with L30. A length of the second inclined face at the front side is denoted with L30z, which is determined from a most upstream point to a point on the front side where the second inclined face reaches the bottom of the block. The remaining portion following the second inclined face is a flat plane facing downward. The length of the remaining portion is denoted with L30x. The lengths L28, L28x and L30z are shown in FIG. 7.

Thus, the paper packaging bag sealing device 4 has the fold guide (the first and second fold guides 28 and 30) folding the vicinity of the bag mouth a of the paper packaging bag A2 along the widthwise direction. Accordingly, the paper packaging bag A2 can more reliably be sealed by being folded. Further, since the paper packaging bag sealing device 4 has the first and second fold guides 28 and 30, the paper packaging bag A2 can more reliably be sealed by being folded in a stepwise manner.

Figure 14:
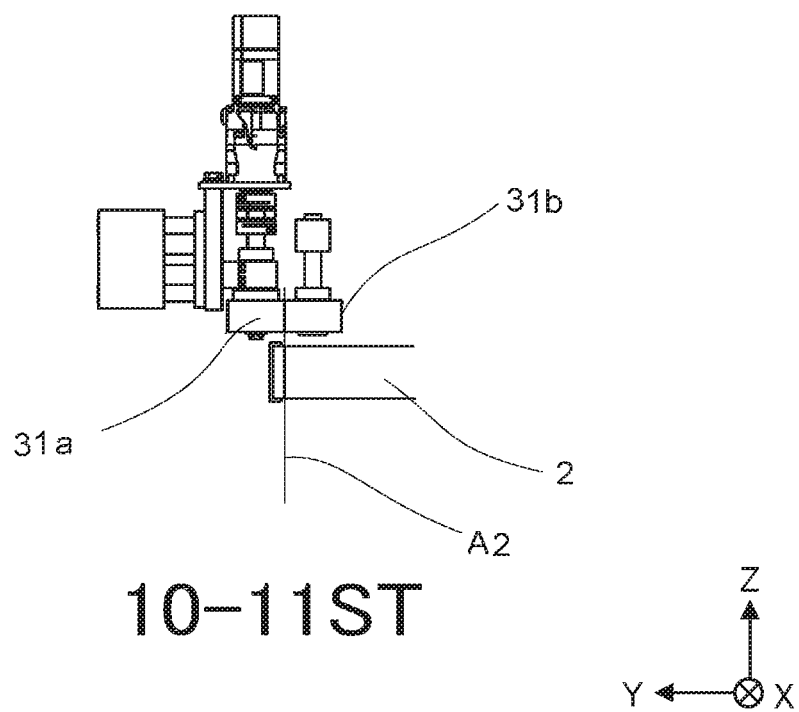
FIG. 14 is a schematic right side view of a clamping member of the packaging machine, showing the working of the clamping member.
Figure 15:
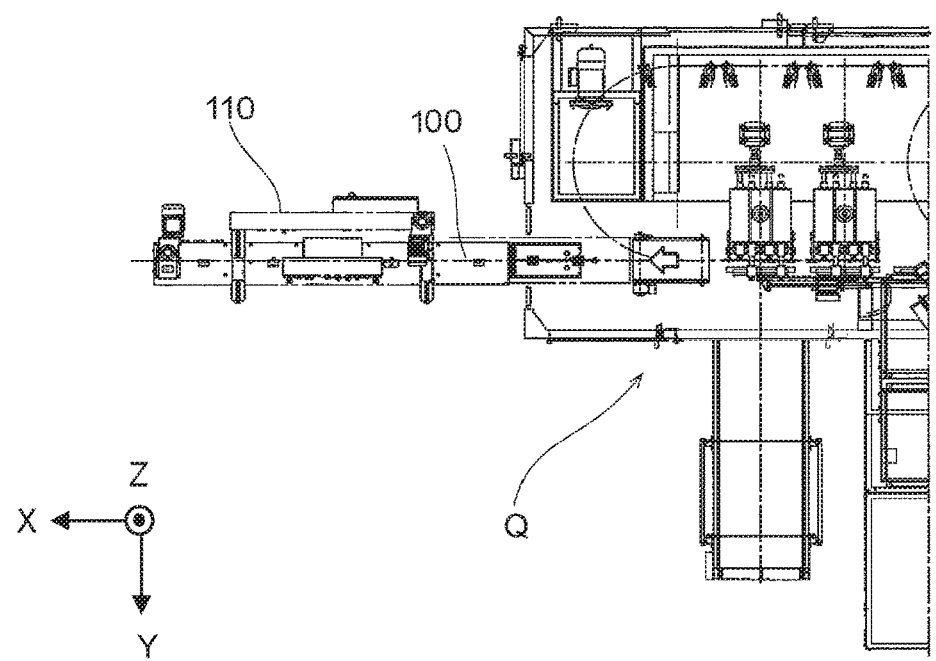
FIG. 15 is a partial plan view of a conventional packaging machine.
Figure 16:
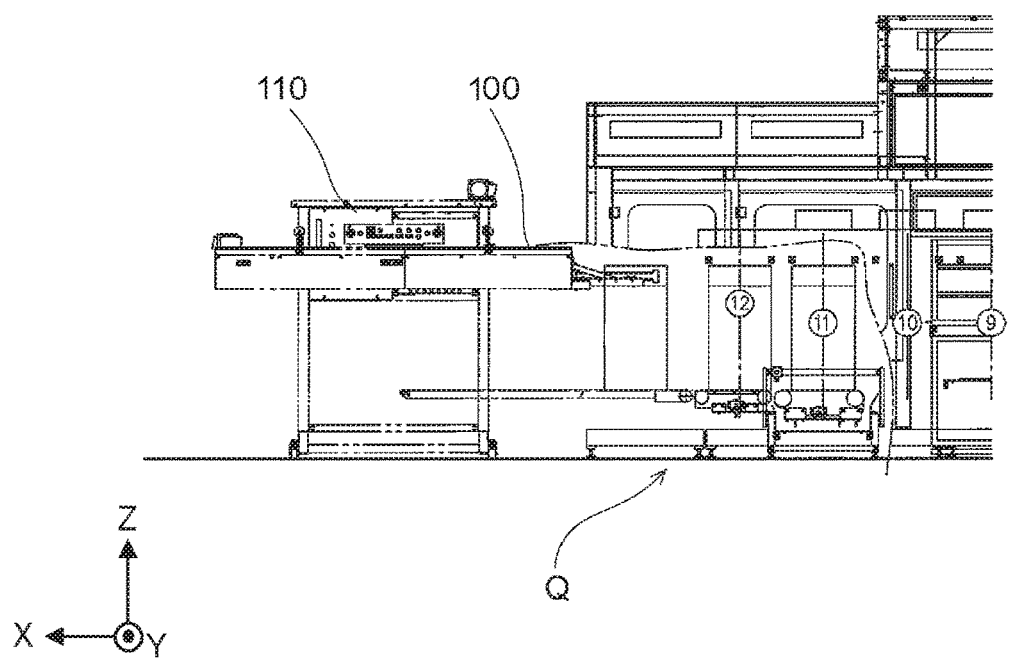
FIG. 16 is a partial front view of the conventional packaging machine.

A pair of clamping bodies 31a and 31b are provided between the sections where the tenth and eleventh steps (10) and (11) are carried out, as shown in FIG. 7, 8 or 14. The clamping bodies 31a and 31b are provided for clamping the paper packaging bag A2 from the surface and back sides thereof thereby to press the surface and back sides against each other. The paper packaging bag A2 can more reliably be sealed by clamping the paper packaging bag A2 from the surface and back sides thereof thereby to press the surface and back sides against each other.

It is desirable that the clamping bodies 31a and 31b comprise a pair of pressing rollers as in the embodiment. When the pressing rollers are rotated in synchronization with the movement of the paper packaging bag A2 held by the paired grips 2, the paper packaging bag A2 can reliably be sealed with prevention of failure in sealing. Further, the pressing rollers are configured to be reciprocable to cope with pressing the paper packaging bags A2 having different thicknesses by changing the pressure therebetween by an electro pneumatic regulator (not shown).

Further, the paper packaging bag sealing device 4 (the first fold guide 28, the heater 29, the second fold guide 30 and the paired clamping bodies 31a and 31b) of the packaging machine P includes reciprocating members 32 and 33 and is configured to be reciprocable. More specifically, the first fold guide 28 and the heater 29 are configured to be moved in an up-down direction by the reciprocating member 32 (a cylinder) provided over the first fold guide 28 and the heater 29, as shown in FIG. 7 or 10. When the paper packaging bag A2 is packaged, the first fold guide 28 and the heater 29 are descended by the reciprocating member 32 (the cylinder) so that the folding step and the adhesive agent b melting step can be carried out.

Further, the second fold guide 30 and the paired clamping parts 31a and 31b are configured to be moved in the up-down direction by the reciprocating member 33 (a cylinder) provided over the second fold guide 30 and the paired clamping parts 31a and 31b, as shown in FIG. 7 or 12. When the paper packaging bag A2 is packaged, the second fold guide 30 and the paired clamping parts 31a and 31b are descended by the reciprocating member 33 (the cylinder) so that the folding step and the adhesive agent b melting step can be carried out.

On the other hand, when the resin packaging bag A1 is packaged, the paper packaging bag sealing device 4 is ascended by the reciprocating members 32 and 33, and the sealing step is carried out by a resin packaging bag sealing device (the first sealing device 23 and the second sealing device 24) which seals the resin packaging bag A1. Thus, the packaging machine P is configured to seal both the resin and paper packaging bags A1 and A2 by changing the sealing device within the machine.

In the packaging machine P of the foregoing embodiment, the paper packaging bag sealing device 4 includes the first fold guide 28, the heater 29, the second fold guide 30 and the paired clamping bodies 31a and 31b. However, the paper packaging bag sealing device may include the clamping parts forming the fold line, and the clamping parts may be reciprocated by the reciprocating member. Further, the paper packaging bag sealing device may further comprise another means for sealing the paper packaging bag. Still further, although the paper packaging bag sealing device 4 of the packaging machine P is reciprocable by the reciprocating members 32 and 33 in the foregoing embodiment, the resin packaging bag sealing device may be reciprocable by the reciprocating members or both the paper packaging bag sealing device and the resin packaging bag sealing device may be reciprocable by the reciprocating members. The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

As shown in FIG. 7, first inclined length (L28) of the first inclined face and first under length (L28x) of the downstream under face (28c), which are determined in the carrying direction, satisfies follow:

$$L28 < L28x.$$

Short L28 (or smaller length) means that the upper region (R1) is folded for a short period. Long L28x (or longer length) means that the folded upper region runs under the first under face for a long period. Accordingly, the folded upper region has longer period to be heated by the heater while carried in the section. Since the heater is arranged between the first inclined face and the second inclined face, the heating process is executed just before the upper region is folded at 180°. That is an ideal timing to do so. Secure and reliable sealing is achieved with the structure.

It is preferred that the first inclined length (L28) is ranged from 20% to 40% with respect to the first under length (L28x), and that the first under length (L28x) is ranged from 50% to 70% with respect to the bag length (LA2).

A second inclined length (L30) of the second inclined face, which is determined in the carrying direction, and the first inclined length (L28) satisfies follow:

$$L30 > L28.$$

It is preferred that the second inclined length (L30) is ranged from 50% to 80% with respect to the bag length (LA2).

What is claimed is:

1. A packaging machine for sealing a paper packaging bag (A2), which is made of paper, comprising:
   a pair of grips (2) that grip vicinities of two lateral sides of a bag mouth (a) of the paper packaging bag such that the paper packaging bag is held in a vertical direction (Z) in a suspended manner with the grips, wherein
   the paper packaging bag has two surfaces that are opposed each other in a depth direction (Y), which is horizontal and perpendicular to the vertical direction,
   an adhesive region (b), over which a sealing adhesive agent spreads, is provided on the front surface of the paper packaging bag, being positioned above the grips, and no adhesive region is provided on the back surface of the paper packaging bag, and
   a side on which the adhesive region is provided is defined as a front side (+Y) of the paper packaging bag with respect to the depth direction, and the other side on which no adhesive region is provided is defined as a back side (−Y) of the paper packaging bag,
   a moving body (3) that intermittently moves the grips along a carrying path from an upstream side to a downstream side in a carrying direction (X) such that the paper packaging bag is carried in the carrying direction, wherein
   the carrying direction is perpendicular to the depth direction and vertical direction,
   a bag length (LA2) of the paper packaging bag is determined in the carrying direction, and
   seen from the carrying direction, the adhesive region is determined to be oriented at 0°,
   a sealing device (4) that comprises a clamp forming part, a first fold guide, a heater, a second fold guide and a clamp sealing part in order to seal the bag mouth, wherein
   the clamp forming part (26a, 26b) is composed with a pair of streaks that are a protrusion streak (27a) and a recessed streak (27b) to form a fold line (g) in the adhesive region, wherein
   the protrusion streak (27a), which extends in the carrying direction, is in a protrusion shape and is arranged at the front side of the paper packaging bag, facing the front surface of the paper packaging bag,
   the recessed streak (27b), which extends in the carrying direction, is in a recess shape and is arranged at the back side of the paper packaging bag, facing the back surface of the paper packaging bag in order to mate with the protrusion streak while pinching the paper packaging bag, and
   the protrusion streak and the recessed streak have a length corresponding to the bag length (LA2) of the paper packaging bag, are arranged above the grips and to be parallel to a height of these grips such that the fold line, which is formed with the protrusion and recessed streaks, extends parallel to the carrying direction, making it easy for an upper region of the adhesive region to bent toward the front side, the upper region (R1) being defined as a region above the fold line in the adhesive region, and the remaining of the adhesive region being defined as a remaining region (R2),
   the first fold guide (28) is arranged at a downstream side from the cramp forming part in the carrying direction, and is composed with a first inclined face (28a) and a first under face (28b and 28c), which is continuously connected to the first inclined face in the carrying direction, wherein
   the first inclined face is arranged over the carrying path to make a contact with the the upper region of the adhesive region as the paper packaging bag is carried in the carrying direction, the first inclined face having a back edge (28be) and a front edge (28fe) with respect to the depth direction (Y), when seen from the carrying direction, the back edge and the front edge are respectively positioned at the back side and the front side of the paper package bag, and the first inclined face is configured to fold the upper region (R1) from 0° toward the front side up to 90°, when being seen from the upstream side in the carrying direction and counts in an anti-clockwise direction, as the paper packaging bag runs thereunder by the back surface of the upper region being pressed with the first inclined face, the first under face is in a flat plane extending horizontally and facing downward (−Z) and is positioned at the same height as the protrusion streak (27a) and a recessed streak (27b) such that the upper region, which has been folded at 90° by the first inclined face, maintains its folded shape as the paper packaging bag runs thereunder, wherein the first under face is composed with an upstream under face (28b) and a downstream under face (28c), which follows the upstream under face in the carrying direction, and, seen from the depth direction, the upstream under face and the downstream under face are respectively positioned at an upstream side and a downstream side in the carrying direction from a most-downstream point (P28x) of the first inclined face, which is defined in the carrying direction, and a first inclined length (L28) of the first inclined face and a first under length (L28x) of the downstream under face (28c), which are determined in the carrying direction, satisfies follow:

$L28 < L28x$, the heater (29) that is arranged at a downstream side from the first inclined face, having a hot air supply block (29a) through which a hot air blows wherein the hot air supply block is disposed below the first under face to blow the hot air toward the first under face such that the upper region folded at 90° is heated with the hot air while carried under the first under face, the second fold guide (30) is arranged at a downstream side from the first under face in the carrying direction, and is composed with a second inclined face (30a) and a second side face (30b), which is continuously connected to the second inclined face in the carrying direction, wherein the second inclined face is arranged lower than the first inclined face and configured to fold the upper region (R1) from 90° up to 180°, which is seen from the upstream side in the carrying direction and counts in the anti-clockwise direction, as the paper packaging bag runs thereunder by the back surface of the upper region being pressed with the second inclined face, the second side face (30b) is in a flat plane, arranged in parallel to face the remaining region of the adhesive region and positioned at the front side such that the upper seal region, which has been folded at 180° by the second inclined face, maintains its folded shape as the paper packaging bag runs thereunder, and a second inclined length (L30) of the second inclined face, which is determined in the carrying direction, and the first inclined length (L28) satisfies follow:

$L28 < L30$, the clamp sealing part is arranged at a downstream side from the second fold guide, and composed with a pair of clamping bodies (31a, 31b), one of which being at the front side and the other of which being at the back side such that the clamping bodies press the upper region, which has been folded at 180°, and the remaining region and seal these regions, and the first under length (L28x) is ranged from 50% to 90% with respect to the bag length (LA2).

2. The packaging machine according to claim 1, wherein the paired clamping bodies comprise a pair of pressing rollers.

3. The packaging machine according to claim 1, wherein the packaging machine is configured to:
form a fold line on the paper packaging bag,
melt the sealing adhesive agent on the paper packaging bag,
widthwise fold a vicinity of the bag mouth of the paper packaging bag and
clamp the paper packaging bag from a front and a back thereof, thereby pressure bonding the paper packaging bag.

4. The packaging machine according to claim 1, wherein the first inclined length (L28) is ranged from 20% to 40% with respect to the first under length (L28x).

5. The packaging machine according to claim 1, wherein the second inclined face is in a flat plane of which a normal line is angled downward with respect to the vertical direction, toward the back side (−Y) with respect to the depth direction and rearward (−X) with respect to the carrying direction.

6. The packaging machine according to claim 1, wherein the first inclined face is in a flat plane of which a normal line is angled downward with respect to the vertical direction, toward the front side (+Y) with respect to the depth direction and rearward (−X) with respect to the carrying direction.

7. The packaging machine according to claim 1, wherein the first inclined face is in a flat plane of which a normal line is angled downward with respect to the vertical direction, toward the front side (+Y) with respect to the depth direction and rearward (−X) with respect to the carrying direction, and the second inclined face is in a flat plane of which a normal line is oriented downward (−Z) with respect to the vertical direction, toward the back side (−Y) with respect to the depth direction and rearward (−X) with respect to the carrying direction.

8. The packaging machine according to claim 1, wherein the second inclined length (L30) is ranged from 40% to 70% with respect to the bag length (LA2).

9. The packaging machine according to claim 8, wherein an interval between the grips (2) in the carrying direction is a length corresponding to the bag length.

10. The packaging machine according to claim 1, wherein an interval between the grips (2) in the carrying direction is a length corresponding to the bag length.

11. A packaging machine for sealing a paper packaging bag (A2), which is made of paper, comprising:
a pair of grips (2) that grip vicinities of two lateral sides of a bag mouth (a) of the paper packaging bag such that the paper packaging bag is held in a vertical direction (Z) in a suspended manner with the grips, wherein
the paper packaging bag has two surfaces that are opposed each other in a depth direction (Y), which is horizontal and perpendicular to the vertical direction,
an adhesive region (b), over which a sealing adhesive agent spreads, is provided on the front surface of the paper packaging bag, being positioned above the grips, and no adhesive region is provided on the back surface of the paper packaging bag, and a side on which the adhesive region is provided is defined as a front side (+Y) of the paper packaging bag with respect to the depth direction, and the other side on which no adhesive region is provided is defined as a back side (−Y) of the paper packaging bag, a moving body (3) that intermittently moves the grips along a carrying path from an upstream side to a downstream side in a carrying direction (X) such that the paper packaging bag is carried in the carrying direction, wherein the carrying direction is perpendicular to the depth direction and vertical direction, a bag length (LA2) of the paper packaging bag is determined in the carrying direction, and seen from the carrying direction, the adhesive region is determined to be oriented at 0°, a sealing device (4) that comprises a clamp forming part, a first fold guide, a heater, a second fold guide and a clamp sealing part in order to seal the bag mouth, wherein the clamp forming part (26a, 26b) is composed with a pair of streaks that are a protrusion streak (27a) and a recessed streak (27b) to form a fold line (g) in the adhesive region, wherein the protrusion streak (27a), which extends in the carrying direction, is in a protrusion shape and is arranged at the front side of the paper packaging bag, facing the front surface of the paper packaging bag, the recessed streak (27b), which extends in the carrying direction, is in a recess shape and is arranged at the back side of the paper packaging bag, facing the back surface of the paper packaging bag in order to mate with the protrusion streak while pinching the paper packaging bag, and the protrusion streak and the recessed streak have a length corresponding to the bag length (LA2) of the paper packaging bag, are arranged above the grips and to be parallel to a height of these grips such that the fold line, which is formed with the protrusion and recessed streaks, extends parallel to the carrying direction, making it easy for an upper region of the adhesive region to bent toward the front side, the upper region (R1) being defined as a region above the fold line in the adhesive region, and the remaining of the adhesive region being defined as a remaining region (R2), the first fold guide (28) is arranged at a downstream side from the cramp forming part in the carrying direction, and is composed with a first inclined face (28a) and a first under face (28b and 28c), which is continuously connected to the first inclined face in the carrying direction, wherein the first inclined face is arranged over the carrying path to make a contact with the upper region of the adhesive region as the paper packaging bag is carried in the carrying direction, the first inclined face having a back edge (28be) and a front edge (28fe) with respect to the depth direction (Y), when seen from the carrying direction, the back edge and the front edge are respectively positioned at the back side and the front side of the paper package bag, and the first inclined face is configured to fold the upper region (R1) from 0° toward the front side up to 90°, when being seen from the upstream side in the carrying direction and counts in an anti-clockwise direction, as the paper packaging bag runs thereunder by the back surface of the upper region being pressed with the first inclined face, the first under face is in a flat plane extending horizontally and facing downward (−Z) and is positioned at the same height as the protrusion streak (27a) and a recessed streak (27b) such that the upper region, which has been folded at 90° by the first inclined face, maintains its folded shape as the paper packaging bag runs thereunder, wherein the first under face is composed with an upstream under face (28b) and a downstream under face (28c), which follows the upstream under face in the carrying direction, and, seen from the depth direction, the upstream under face and the downstream under face are respectively positioned at an upstream side and a downstream side in the carrying direction from a most-downstream point (P28x) of the first inclined face, which is defined in the carrying direction, and a first inclined length (L28) of the first inclined face and a first under length (L28x) of the downstream under face (28c), which are determined in the carrying direction, satisfies follow:

$L28 < L28x$, the heater (29) that is arranged at a downstream side from the first inclined face, having a hot air supply block (29a) through which a hot air blows wherein the hot air supply block is disposed below the first under face to blow the hot air toward the first under face such that the upper region folded at 90° is heated with the hot air while carried under the first under face, the second fold guide (30) is arranged at a downstream side from the first under face in the carrying direction, and is composed with a second inclined face (30a) and a second side face (30b), which is continuously connected to the second inclined face in the carrying direction, wherein the second inclined face is arranged lower than the first inclined face and configured to fold the upper region (R1) from 90° up to 180°, which is seen from the upstream side in the carrying direction and counts in the anti-clockwise direction, as the paper packaging bag runs thereunder by the back surface of the upper region being pressed with the second inclined face, the second side face (30b) is in a flat plane, arranged in parallel to face the remaining region of the adhesive region and positioned at the front side such that the upper seal region, which has been folded at 180° by the second inclined face, maintains its folded shape as the paper packaging bag runs thereunder, and a second inclined length (L30) of the second inclined face, which is determined in the carrying direction, and the first inclined length (L28) satisfies follow:

$L28 < L30$, the clamp sealing part is arranged at a downstream side from the second fold guide, and composed with a pair of clamping bodies (31a, 31b), one of which being at the front side and the other of which being at the back side such that the clamping bodies press the upper region, which has been folded at 180°, and the remaining region and seal these regions, and the second inclined length (L30) is ranged from 40% to 70% with respect to the bag length (LA2).

* * * * *